United States Patent [19]

Vaughan

[11] Patent Number: 5,624,657
[45] Date of Patent: Apr. 29, 1997

[54] CRYSTALLINE ZEOLITE COMPOSITION ECR-31 AND PROCESS FOR ITS PREPARATION

[75] Inventor: David E. W. Vaughan, Flemington, N.J.

[73] Assignee: Exxon Research and Engineering Company, Florham Park, N.J.

[21] Appl. No.: 544,344

[22] Filed: Oct. 17, 1995

Related U.S. Application Data

[63] Continuation-in-part of Ser. No. 332,987, Nov. 1, 1994, abandoned.

[51] Int. Cl.[6] .................................................. C01B 39/46
[52] U.S. Cl. .......................... 423/700; 423/718; 423/709; 423/DIG. 28
[58] Field of Search .................................. 423/700, 701, 423/705, 707, 709, 718

[56] References Cited

U.S. PATENT DOCUMENTS

| | | | |
|---|---|---|---|
| 3,216,789 | 11/1965 | Breck et al. | 423/718 |
| 3,459,501 | 8/1969 | Plank et al. | |
| 4,199,556 | 4/1980 | Plank et al. | 423/701 |
| 4,452,907 | 6/1984 | Ball et al. | 423/701 |
| 4,544,539 | 10/1985 | Wortel | 423/DIG. 28 |
| 4,552,731 | 11/1985 | Vaughan . | |
| 4,554,146 | 11/1985 | Vaughan | 423/DIG. 28 |
| 4,717,560 | 1/1988 | Vaughan | 502/60 |
| 5,318,766 | 6/1994 | Vaughan et al. | 423/700 |

Primary Examiner—Mark L. Bell
Assistant Examiner—David Sample
Attorney, Agent, or Firm—Ronald D. Hantman

[57] ABSTRACT

ECR-31 is a new zeolite having a 12-ring channel. It may be expected to have similar properties to other 12-ring channel zeolites in catalysis and separations.

9 Claims, 3 Drawing Sheets

CRYSTALLINE ZEOLITE COMPOSITION ECR-31 AND PROCESS FOR ITS PREPARATION

CROSS REFERENCE TO RELATED APPLICATIONS

This application is a continuation-in-part of U.S. Ser. No. 332,987 filed Nov. 1, 1994 now abandoned.

FIELD OF THE INVENTION

This invention relates to a novel alumino-silicate zeolite, designated ECR-31, having an apparent 12-ring channel structure, and a method for preparation and use.

BACKGROUND OF THE INVENTION

The family of materials known as zeolites constitute a large group of silicates having appreciable void volume within their structures. In the ideal state they may be viewed as built from corner shared $SiO_4^{4-}$ tetrahedral building units which form a large range of architectures comprising cavities, channels and cages. In the pure silica forms the structures are charge neutral frameworks stuffed with either neutral molecules, usually water or other neutral solvent molecules, or salt pairs, such as NaCl. These pure silica forms have been designated "clathrasils" or "zeosils" (Liebau et al., Zeolites, v.6, 373, 1986). More commonly Al substitutes for some of the silica, in which case the framework possesses a net negative charge which is balanced by "exchangeable" cations-commonly those of Groups 1 and 2 of the Periodic Table (Kirk-Othmer Encyclopedia of Chemical Technol., J. Wiley (New York), v.8, 94, 1965). However, numerous substitutions are now recognized as being possible both in the Si framework substituents and the exchangeable cations, as demonstrated in much of the recent art. A major expansion of these structural types has been achieved with the recognition that $AlPO_4$ has many structures beyond the well known silica analogues of quartz-tridymite—cristobalite (Flanigen et al., Proc. 7th Intl. Zeolite. Conf., Ed. Murakami et al., Kodansha/Elsevier (Tokyo), p. 103, 1985). Many zeolites occur as minerals (Tschernich, "Minerals of the World", Geoscience Press (Phoenix, Ariz.) 1992), some of which have no synthetic counterparts. Similarly many synthetic zeolites have no naturally occurring counterparts. The large number of existing known structures has been reviewed by Meier and Olson ("Atlas of Zeolite Structures", Butterworths-Heinemann Press (London), 1992). The unique catalytic, sorption and ion-exchange properties of these zeolite "molecular sieves" have been utilized in many industrial and environmental processes, and numerous consumer products. (As reviewed in the periodic Proceedings of the International Zeolite Conferences).

There are a large number of synthetic methods for producing zeolites, well illustrated in the patent literature and reviewed by Barrer (in "Hydrothermal Chemistry of Zeolites", Academic Press (London), 1982), Breck (in "Molecular Sieve Zeolites", J. Wiley (New York), 1974) and Jacobs and Martens (in "Synthesis of High Silica Alumino-silicate Zeolites.", Elsevier (Amsterdam), 1987). Reactants may be general or specific and typical reaction conditions are below about 250° C. and 50 bars pressure. The primary solvent is usually water, but others, such as ammonia (e.g., U.S. Pat. No. 4,717,560) and organic liquids (e.g., U.S. Pat. No. 5,160,500), have also been used. Methods for controlling the zeolite type produced, and its composition, include "seeds" as nucleation centers and organic molecules (frequently alkylammonium salts) as structural "templates".

In addition to the many known natural and synthetic zeolite structures built from corner shared tetrahedra, there are innumerable structures which are theoretically possible from the viewpoint of poyhedrageometry and mathematical combinatorial theory (e.g., Smith, Proc. 8th Intl. Zeolite Conf., Elsevier (Amsterdam), p. 29, 1989; Treacy et al., Proc. 9th Intl. Zeolite Conf., Butterworths-Heinemann (MA, USA), p. 381, 1993). The challenge of the synthetic chemist is to discover the synthesis methods that will make possible their creation.

This invention relates to a novel zeolite, ECR-31, and to a novel process for its preparation. In particular, the zeolite has a structure in which the main feature seems to be a one dimensional, 12-ring channel (FIG. 1). An unusual characteristic of its synthesis is that it is synthesized from a co-solvent system containing ammonia and water.

Several zeolites containing 12-ring channels are well known in the literature, such as mordenite, offretite, gmelinite, cancrinite, mazzite, ECR-1 and Linde L. Several of these have important catalytic properties which made them useful in such processes as isomerization (mordenite and mazzite), dewaxing (mordenite and offretite) and aromatization or reforming (Linde L). The specific unique properties are thought to be derived from combinations of structural features and chemical composition, often associated with particular noble metal dispersions. The differences in channel configuration in several of these materials has been illustrated by Gramlich-Meier and Meier (J. Solid State Chem., Vol. 44, p. 41 (1982)).

ECR-31 is a new zeolite structure with a unique channel configuration, an "as synthesized" $SiO_2/Al_2O_3$ ratio between 3 and 10, and an estimated unit cell which is proposed to be hexagonal with approximate axes of a=18.5 Å by c=7.6 Å. Although two well known zeolites (Linde L and mazzite) and one well publicized theoretical structure (Omega of Barrer & Villiger) have such a unit call, ECR-31 has an x-ray diffraction pattern different from any of these. Compared to the LTL pattern, peaks representing 111, 221, 331, and 441 of LTL are missing. However, numerous other structures may have these cell dimensions (Treacy, et al., ibid). ECR-31 shows a strong absorption peak in the I.R. spectrum at 605 $cm^{-1}$ and a shoulder at 1130 $cm^{-1}$ (FIG. 2), previously associated with 6-rings and 5-rings, respectively, in zeolite structures (Flanagan, et al. Adv. Chem. Sec. 101, p. 201, (1971)).

SUMMARY OF THE INVENTION

It has now been found that a new zeolitic material designated herein for convenience as ECR-31 has the x-ray diffraction pattern shown in Table 1 and an apparent 12-ring channel structure as observed by high resolution electron microscopy (FIG. 1). This zeolite is useful as a catalyst base in hydrocarbon conversions such as aromatization, hydroisomerization, dewaxing and other hydrocracking reactions.

The present invention is a synthetic crystalline zeolite composition having the formula in terms of mole ratios:

where n is the valence of metal M, x is between 3 and 10, and y is between 0 and 12, depending on the degree of hydration, and characterized by its potassium cation form having the prominent x-ray diffraction pattern lines presented in Table 1.

It is preferably made from a pre-formed silica-alumina gel reacted within the total reactant composition ratios represented by the following reactant ratios:

$SiO_2/K_2O = 1.2$ to $1.6$ $SiO_2/Al_2O_3 = 3$ to $14$ $NH_3/Al_2O_3 = 40$ to $140$ $H_2O/Al_2O_3 = 85$ to $300$

Depending upon the specific Si/Al ratio and the cation and solvent compositions, minor variations in the position and intensity of the diffraction lines in Table 1 are to be expected.

DESCRIPTION OF THE PREFERRED EMBODIMENT

The present invention is a novel zeolite being characterized by having a new structure, as evidenced by its unique x-ray diffraction pattern and other properties. Its composition, as presently made, is a potassium aluminosilicate that is made in a different synthesis system compared to prior art compositions of this type unit cell, comprising a pre-made silica-alumina gel aged in an aqueous ammonia solvent system.

Figure 1:
FIG. 1 shows a high resolution electron micrograph of ECR-31 showing features interpreted as longitudinal 12-ring channels.

High resolution electron microscopy indicates that the principal structural feature is a 12-ring channel system (FIG. 1). Computer analysis of the x-ray diffraction data indicates hexagonal symmetry and a=18.5 Å. Infra-red analysis (IR) seems to indicate that the structure contains 5-rings. Not to be bound by any specific structure, it can be effectively characterized by x-ray diffraction, IR and other methods of analysis. 12-ring structures of this type have found wide use as catalysts and sorbents, such materials include mordenite, offretite and mazzite (alias omega or ZSM-4) as hydroisomerization and hydrocracking catalysts and Linde-L as reforming catalysts.

The preferred source of silica and alumina in this preparation is in a combined form, made in any of the well known ways for making silica alumina gels. Several such methods have been described in the art (e.g., Magee and Blazek, Amer. Chem. Soc. Monogr. 171, Ed. J. Rabo, p.618–20 (1976), and associated references). They generally comprise combining a source of reactive silica with a source of reactive alumina under specific pH conditions followed by controlled temperature, aging, filtration, washing to remove excess basic salts, then drying. Spray dried products are particularly useful because of low cost, ease of handling and their fine particulate form.

The reactant mixture is prepared by weighing the pre-formed gel into a sealable reactor capable of withstanding several atmospheres pressure, adding KOH pellets or preferably a concentrated solution of KOH, then cooling the mixture to about 0° C. in an ice bath. The aqueous ammonia is then added and the reactor sealed quickly to avoid loss of NH$_3$. Liquid ammonia from an inverted pressure cylinder of liquid ammonia may also be used as the ammonia source, in which case the reactor is preferably pre-cooled in solid CO$_2$ prior to ammonia addition. An alternate method is to use commercially available aqueous ammonia containing up to about 29% of ammonia.

The mixture in a reactor (ordinarily one which can withstand elevated pressures such as a tetrafluoroethylene-lined jar or an autoclave) is then heated at a temperature of between about 70° C. and 150° C., preferably 80° to 110° C. When the mixture is heated it is maintained at autogenous pressures which will depend on the temperature employed. The amount of time required obtaining full crystallization will depend mainly on the temperature employed, so that at 90° C. the heating may be carried out, e.g., for up to 40 days or more, whereas at 140° C. the time period may be, e.g., 10 days. In any event, the heating is carried out until crystals are formed of the alumino-silicate zeolite products, i.e., ECR-31.

When the ECR-31 crystals have been obtained in sufficient amount, they are recovered by centrifugation or filtration from the reaction mixture and are then washed, preferably with deionized water, to separate them from the mother liquor. The washing should continue, for best purity results, until the wash water, equilibrated with the product, has a pH of between about 9 and 12. After the washing step the zeolite crystals may be dried.

In order to convert the inventive zeolites into useful sorbents and catalysts, exchangeable cations are partially or fully replaced with those found most desirable for the process of interest. The exchangeable cation may be of metals from any one of Groups I through VIII of the Periodic Table (Kirk-Othmer, Encyclopedia of Chemical Technology, v. 8, p. 94 (1965), J. Wiley (New York) or rare earth metals, depending on the end use desired. Preferably, the cations will be mono-, di- and trivalent metal cations, particularly from Groups I, II or III of the Periodic Table such as barium, calcium, cesium, lithium, magnesium, potassium, strontium, zinc, or the like, or hydrogen, rare earth cations or ammonium. The presence of these exchangeable cations will generally not cause a substantial alteration of the basic crystal structure of the silicate. Particularly preferred are mono- and divalent cations, as they are more easily included in the pores of the zeolite crystal. Any ion exchange technique may be employed such as those discussed, for example, in U.S. Pat. No. 3,216,789. For use in prior mentioned catalytic applications, cations of Group 8A are particularly useful, exchanged or impregnated into the zeolite then reduced in a reducing atmosphere so as to form highly dispersed nano clusters of metal.

EXAMPLE 1

A reaction slurry was made having the following reaction stoichiometry:

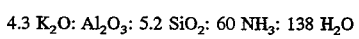

4.3 K$_2$O: Al$_2$O$_3$: 5.2 SiO$_2$: 60 NH$_3$: 138 H$_2$O by mixing together 4.75 gms 25% Al$_2$O$_3$–75% SiO$_2$ gel fluid cracking catalyst (Davison Chemical Co. Hi-alumina), 6.56 gms KOH.½H$_2$O and 40.5 gms NH$_4$OH (29% aqueous NH$_3$). This was reacted in a 75 ml stainless steel autoclave at 100° C. for 28 days.

Figure 2:
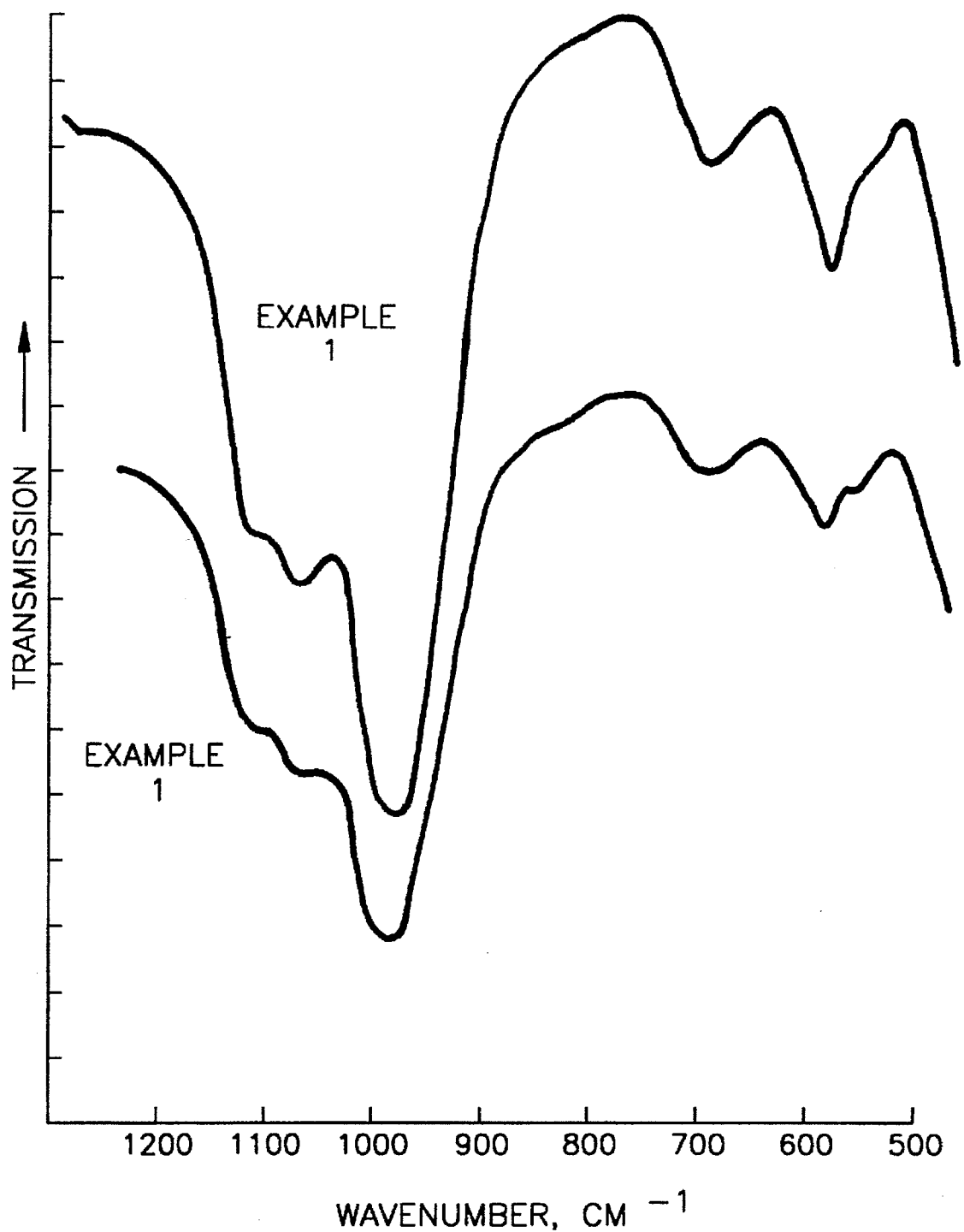
FIG. 2 shows infra red spectra for ECR-31, Examples 1 and 2, showing strong peaks at about 605 cm$^{-1}$, 740 cm$^{-1}$, 1100 cm$^{-1}$, 1090 cm$^{-1}$, and 1130 cm$^{-1}$.
Figure 3:
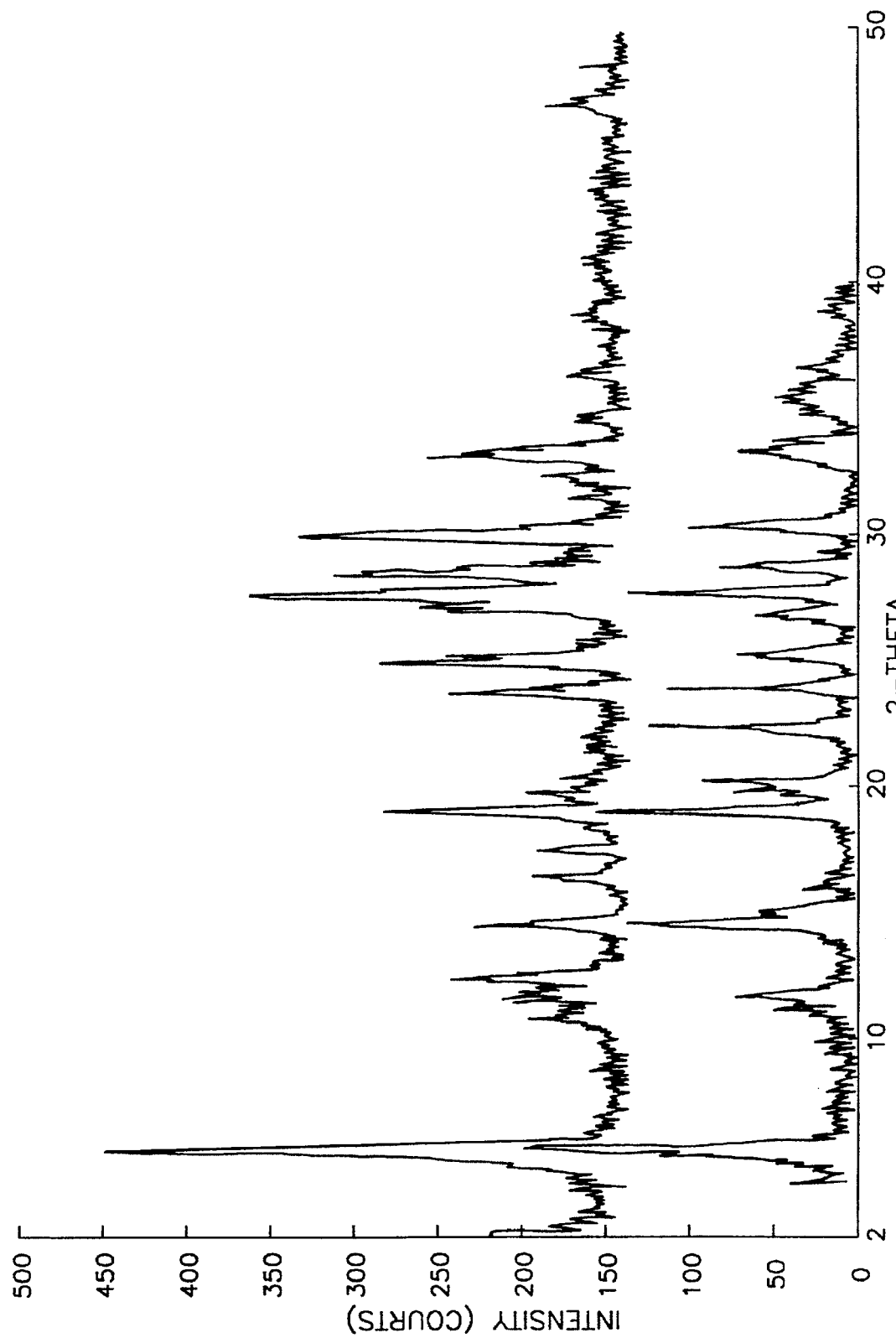
FIG. 3 is an x.-ray diffraction pattern for ECR-31 (CuKα radiation, Siemens D500 diffractometer) (top), compared with the same for a nano-crystal LTL material made in an aqueous ammonia system (U.S. Pat. No. 5,318,766).

After reaction the sample was filtered, washed and dried at 100° C. X-ray diffraction analysis (Cu K alfa radiation) gave an ECR-31 diffraction pattern containing a minor amount of merlinoite impurity. 2 gms of this ECR-31 were exchanged for 1 hour at 60° C. in a solution of 2 gms NH$_4$Cl dissolved in 10 gm H$_2$O. After filtering, washing, drying at 100° C., then calcining at 400° C. for 1 hour, the sample was exposed to n-hexane at 23° C. and 42 torr. This sorption test indicated a n-hexane capacity of 7.9 wt %. Electron microscopy showed the crystals to be much smaller than 0.1 µ and the structure to compose 12 ring channels with no blockage visible (FIG. 1). $^{29}$Si-MASNMR gave a single broad peak centered at –95.3 ppm vs. DSS. Thermo gravimetric analysis of the ammonium exchanged ECR-31 gave a weight loss of 10.4% up to 250° C. followed by a further weight loss of 5.2% between 250° C. and 600° C. Argon pore size analysis, using an omnisorb 360 porosimeter, gave a major peak at 6A pore diameter. Chemical analysis by ICP-AES gave a composition: 22.4 wt % Si and 12.8 wt % Al; giving an ECR-31 $SiO_2/Al_2O_3$ ratio of 3.36. The IR spectrum is shown in FIG. 2, and the x-ray diffraction pattern listed in Table 2 and shown in FIG. 3.

EXAMPLE 2

A reaction slurry having a stoichiometry of approximately:

$$8.6\ K_2O:\ Al_2O_3:\ 11.9\ SiO_2:\ 120\ NH_3:\ 276\ H_2O$$

was made by reacting the same KOH-aqueous ammonia solution of Example 1 with 4.75 gms. 12.5% $Al_2O_3$ Lo-alumina fluid cracking catalyst (Davison Chemical Company). After reacting this composition at 100° C. for 43 days the sample was filtered, washed, dried at 110° C. and analyzed by x-ray diffraction. The x-ray diffraction pattern was essentially similar to that shown in Table 2. $^{29}$Si-MASNMR gave a very broad spectrum centered at –95 ppm vs. DSS. Chemical analysis by ICP-AES gave a product analysis of: 20.7 wt % Si; 11.0 wt % Al; 17.2 wt % K; representing an ECR-31 oxide stoichiometry of: 1.08 $K_2O$: $Al_2O_3$: 3.62 $SiO_2$. The IR spectrum of this sample is shown in FIG. 2.

EXAMPLE 3

The products of Examples 1 and 2 were combined, exchanged with a 0.1N KCl solution at a pH=9, filtered, dried then blended with KCl 20 wt % alumina powder. This powder was pressed into pellets, then crushed to a particulate in the 20–60 mesh range. This sample was impregnated with 0.64 wt % Pt as $Pt(NH_3)_4Cl_2$ dissolved in distilled water, dried at 110° C. for 3 hours, then reduced and tested as an aromatization catalyst using a standard test for the conversion of hexane to benzene (e.g., see U.S. Pat. No. 4,832,824). The fixed bed reaction was carried out at 510° C., 8 WHSV with a feed comprising a mixture of 60% 3-methyl pentane and 40% n-hexane, with a $H_2$/oil ratio of 4.25. After 4 hours on stream the hexane conversion was 42 with 62% selectivity for benzene.

TABLE 1

| dÅ | Intensity |
|---|---|
| 16.1 ± 0.3 | vs |
| 6.1 ± 0.2 | m |
| 4.65 ± 0.1 | s |
| 3.75 ± 0.1 | m |
| 3.54 ± 0.06 | vs |
| 3.28 ± 0.06 | m |
| 3.24 ± 0.06 | vs |
| 3.11 ± 0.06 | s |
| 2.95 ± 0.04 | vs |
| 2.66 ± 0.04 | vs |
| 2.57 ± 0.04 | m |
| 2.285 ± 0.02 | m |
| 1.91 ± 0.01 | m |
| 1.68 ± 0.01 | m |
| 1.585 ± 0.01 | m | where very strong (vs) lines have relative intensities over about 70%; strong (s) lines relative intensities between 40% and 70%; medium (m) lines relative intensities between about 20 and 40%.

TABLE 2

| dÅ | 2Θ | I |
|---|---|---|
| 16.26 | 5.47 | vs |
| 9.28 | 9.59 | w |
| 7.63 | 11.68 | m |
| 7.16 | 12.45 | w |
| 6.12 | 14.58 | m |
| 5.40 | 16.52 | w |
| 4.66 | 19.18 | s |
| 4.48 | 19.97 | m |
| 4.32 | 20.69 | w |
| 3.745 | 23.92 | m |
| 3.557 | 25.20 | vs |
| 3.278 | 27.39 | ms |
| 3.216 | 27.91 | vs |
| 3.108 | 28.92 | s |
| 2.972 | 30.27 | vs |
| 2.833 | 31.79 | w |
| 2.748 | 32.81 | w |
| 2.682 | 33.63 | vs |
| 2.569 | 35.17 | m |
| 2.457 | 36.82 | m |
| 2.281 | 39.25 | m |
| 2.055 | 44.06 | w |
| 1.910 | 47.61 | m |
| 1.842 | 49.48 | w |
| 1.683 | 54.73 | m |
| 1.588 | 58.10 | m |

(vs = 70–100%; s = 40–70%; m = 15–40%; weak = <15%)

What is claimed is:

1. A synthetic crystalline zeolite composition having the formula in terms of mole ratios $$M_{2/n}O:\ Al_2O_3:\ xSiO_2"(y(H_2O,\ NH_3)$$

where n is the valence of metal M, x is between 3 and 10, and y is between 0 and 14 and characterized having a representative x-ray diffraction pattern (cu $K_\alpha$ radiation) with major lines shown in Table 1.

2. The zeolite of claim 1 wherein M is a mono-, di- or trivalent metal cation selected from Group I to III of the Periodic Table, or mixtures thereof.

3. The zeolite of claim 1 having an oxide composition in the range:

0.9 to 1.2 $K_2O$: $Al_2O_3$: 3.0 to 6.0 $SiO_2$.

4. A process for preparing the crystalline zeolite of claim 1 where M is K and n is 1, which comprises:

(a) preparing a reaction mixture comprising water, a source of silica alumina gel, KOH and ammonia, said reaction mixture having a composition, in terms of mole ratios of oxides, within the following ranges:

| | |
|---|---|
| $SiO_2/K_2O$ | 1.2 to 1.6 |
| $SiO_2/Al_2O_3$ | 3.0 to 14 |
| $NH_3/Al_2O_3$ | 40 to 140 |
| $H_2O/Al_2O_3$ | 85 to 300 |

(b) maintaining the reaction mixture at between about 70° C. and 150° C. under autogenous pressure for a sufficient period of time to form crystals of the zeolite.

5. The process of claim 4 wherein during step (b) the reaction mixture is agitated to maintain substantial homogeneity thereof.

6. The process of claim 4 wherein the crystalline zeolite product has a composition in the range:

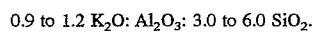

0.9 to 1.1 $K_2O$: $Al_2O_3$: 3 to 4.5 $SiO_2$.

7. The process of claim 4 wherein the silica-alumina gel is partially dried.

8. The process of claim 4 wherein the source of silica-alumina gel is a spray dried amorphous silica-alumina particulate, exchanged with ammonium cations, and having a $(Na,K)_2O$ content less than 3 wt % on a dry basis.

9. The process of claim 4 wherein prior to step (b) microcrystals of a zeolite are added to the blended reaction mixture in an amount of from 0.1 to 10% by weight based on silica and alumina.

* * * * *